United States Patent [19]
Kosho et al.

[11] Patent Number: 6,021,695
[45] Date of Patent: Feb. 8, 2000

[54] LATHE AND A MACHINING SYSTEM OF A LATHE

[75] Inventors: Akira Kosho; Satoru Togawa; Keiichi Miyagawa; Kazuhiko Oiwa, all of Chiba, Japan

[73] Assignee: Hitachi Seiki Co., Ltd., Abiko, Japan

[21] Appl. No.: 08/967,783

[22] Filed: Nov. 10, 1997

[30] Foreign Application Priority Data

Nov. 11, 1996 [JP] Japan .................................. 8-314230
Nov. 11, 1996 [JP] Japan .................................. 8-314231

[51] Int. Cl.$^7$ ........................................................ B23B 7/06
[52] U.S. Cl. ................................ 82/122; 82/138; 82/149; 29/35.5
[58] Field of Search ............................. 82/122, 120, 121, 82/149, 138; 29/35.5, 39, 40, 41; 408/35

[56] References Cited

U.S. PATENT DOCUMENTS

| | | | |
|---|---|---|---|
| 3,792,633 | 2/1974 | Filipiev et al. | 82/122 X |
| 3,918,331 | 11/1975 | Svanstrom | 82/120 X |
| 4,730,373 | 3/1988 | Senoh | 82/122 X |
| 4,742,739 | 5/1988 | Yamaguchi et al. | 82/149 X |
| 5,439,431 | 8/1995 | Hessbrüggen et al. | |

FOREIGN PATENT DOCUMENTS

| | | | |
|---|---|---|---|
| 0265201 | 11/1986 | Japan | 82/122 |
| 1169267 | 1/1991 | U.S.S.R. | 82/121 |

*Primary Examiner*—Andrea L. Pitts
*Assistant Examiner*—Henry W. H. Tsai
*Attorney, Agent, or Firm*—Armstrong, Westerman, Hattori, McLeland & Naughton

[57] ABSTRACT

A lathe or each of lathes of a machining system comprises a head stock, which is transferred on a rail mechanism. The rail mechanism includes a vertically guiding rail which is mounted on a horizontally guiding rail. A turret has a turret support which has a pair of turret support attaching surfaces. The turret is attached with either of turret support attaching surfaces. A extruded horizontally guiding rail is located between both the bed bodies, each of which is included in each of the lathes. The extruded horizontally guiding rail is identical with a connecting guiding rail which connects the one horizontally guiding rail of the one lathe with the other horizontally guiding rail of the other lathe. A work stocking means is located between the bed bodies. A reversing means for reversing works is provided with the head stock.

3 Claims, 9 Drawing Sheets

LATHE AND A MACHINING SYSTEM OF A LATHE

FIELD OF THE INVENTION

The present invention relates to a lathe such as a vertical lathe for boring and turning a work. The present invention in particularly relates to a lathe wherein the axis line of a head stock is oriented in the vertical direction and the head stock is movable or fixed, and further relates to a machining system entailing a combination of lathes.

PRIOR ARTS

A lathe, such as a vertical lathe has a head stock which has a main spindle, the axis of which is oriented in the vertical direction. A single work to be cut rotates with its being held by a work holding chuck. Works to be cut are automatically or manually inserted, and the cut works are also automatically or manually discharged.

The inventor provided a machining system disclosed in Japanese Disclosure (laid-open) No. Heisei 2-46321, wherein a head stock is movably provided with a slant type of bed body without any robot or any loader. The main spindle of the head stock of such a type of machine tool has a work holding chuck, by which works are inserted from a works stocking means, and discharged thereinto.

Such a type of lathe is inefficient in terms of discharging, because cut materials such as chips stay on the slant type of bed body. As the main body of the machine, the bed body is deformed due to the thermal energy which is brought about from the bearing and the cut materials. Such thermal deformation or distortion leads to the deformation of the guiding surfaces on which the movable bodies, such as supports and tables are guided, thereby, a decreased precision in dimension results. It is desirable that deformation of the bed is avoided.

Such a known lathe has a head stock, the axis line of which is inclined. The axis line of the works on the work stocker needs to be inclined so that the axis lines of the works are parallel with the axis line of the head stock. A work inclining means or a work supporting means may be provided in order to stabilize the works. Without any work inclining means or work supporting means, works are not smoothly inserted into the head stock from the work stocker, and are not placed on the work stocker in an stabilized means.

Further, in such a known lathe, the guiding portion of the machining sphere which forms a machining sphere and the guiding portion of transferring which forms a transferring sphere is formed as one bed body. Such a formation of the one bed body necessarily makes the one bed body larger in dimension, therefore it is difficult to make the area of the floor for placing the bed smaller. The one body formation wastefully requires the transferring guiding portion to have too much rigidity. Because of such a formation, the machine is too large in dimension in comparison with the maximum size of the works, thereby requiring the space for placing the machine to be too big.

Another art which is disclosed in Japanese Patent Disclosure No.Heisei 60-249501, shows a NC lathe wherein an opening-and-closing chuck is provided with a head stock, the axis line of the main spindle of which is oriented in the vertical direction. Such a known NC lathe has a structural formation wherein a head stock is supported by a gate-like frame or a horizontally extruding beam, and cut materials are accumulated on the bed, and the cutting oil flowing on the bed. Such a formation generates thermal deformation.

There has not been any idea with respect to increasing accuracy for the works in dimensions, these works dimensions having a decreased precision due to thermal deformation, which brings out a relative displacement between the head stock and the tools of a tools stocking support or a tools rest fixed with a bed. Further, there has not been any idea concerning a decrease in the work space area.

The head stock is moved toward a works stocking means in the horizontal direction so that works are automatically provided to and discharged from the works stocking means. The head stock is provided with a bed body so that the head stock is moved in the direction until it reaches the position of the works stocking means, wherein the bed body has a long horizontally guiding surface for moving the head thereon. As a result, the horizontally guiding portion for moving, which does not need more rigidity since the force put upon it by the cutter during machining is weak, is formed in a body with the bed body. Such a particularly rigid structure, wherein the size of the bed body is so much larger in dimension in comparison with the maximum size of the machined work, is wasteful. It is desirable that there be provided such a vertical lathe wherein the space for the lathe is smaller, so that the production cost is lower and the production efficiency is higher. It is further desirable that there be provided such a vertical lathe which is available in connection with another vertical lathe.

In a lathe according to such a known art, where the axis line of a main spindle is inclined against a vertical surface, the problem of needing to incline a work when the work chucking means holds and removes the work is an avoidable one. Still further, the known art has an idea that it is used as single machine tool, but has no idea of its being used in combination with another lathe in correspondence to the number of processings and the kind of processing.

It is further desirable that there be provided a lathe wherein the number of machine tools, the location or formation of machine tools and so on are freely chosen in combination as not known in the known arts.

There has been no idea of using a multiple of lathes mutually related or connected in operation. It is further desirable that a multiple of lathes are relatively or mutually operated with correspondence to processing or machining, wherein the number and position of machines are voluntarily chosen.

SUMMARY OF THE INVENTION

An object of the present invention is to provide a lathe used as a unit wherein a free combination of the units is available so that the combination of units is able to be used as a single machining system.

A further object of the present invention is to provide a machining system of a multiple of lathes which comprises a minimum number cell units, wherein the formation thereof is simple.

A still further object of the present invention is to provide a machining system having a multiple number of units of lathes which are able to provide works automatically without any work providing means such as a robot or a loader.

A still further object of the present invention is to provide a lathe or a pair of lathes, wherein both sides of one work are processed by a single machine thereof.

A still further object of the present invention is to provide a lathe wherein there is little thermal deformation and distortion due to thermal energy, thereby minimizing the negative effect thereof on precision.

A still further object of the present invention is to provide a lathe which is of small size, and variously used with a movable or transferring support moving beyond a bed body.

A lathe or a machining system of a lathe according to the present invention is freely available for a single vertical lathe or a machining system formed of a multiple number of units of vertical lathes. Such a unit of lathe operates as a minimum number of units of machining cells, the structure of which is simple. A machining system of a lathe according to the present invention can automatically provide and discharge works without any loader or any robot.

A lathe according to the present invention comprises a bed body. The bed body has a vertical surface, on or to which a turret or a turret support is attached or mounted. The bed body, which is identical with the body of the lathe, includes a horizontally guiding rail. The horizontally guiding rail is mounted on the bed body. The lathe comprises a movable support, which is movably mounted on or attached to the horizontally guiding rail. A vertically guiding rail is mounted on or attached to the movable support. The lathe comprises a head stock, which is movably mounted on the vertically guiding rail. The head stock includes a main spindle, the main spindle is rotatably supported by the head stock. The axis line of the main spindle is oriented in the vertical direction. The head stock may include a motor for driving the main spindle, and a work holding chuck for holding each of works during working or machining. The work holding chuck faces against the turret.

In the lathe the turret support has a pair of turret support attaching surfaces, which are located on both portions that are mutually opposite with respect to the given vertical surface. The one surface of the turret support attaching surfaces is desirably situated in symmetry with the other surface of the turret support attaching surfaces with respect to the given vertical surface. Single turret is desirably attached with the one of turret support attaching surfaces, but two turrets are respectively attached with the both turret support attaching surfaces.

The horizontally guiding rail is desirably include an extruding portion, which is extruded in the horizontal direction so that it is longer than the bed body. The works are introduced into and discharged out of the working space by the work holding chuck.

The lathe further comprises a works stocking means for stocking the works. The work stocking means may be located near at the bed body and the extruding portion. The extruding portion may be removably connected with the horizontally guiding rail which is placed on and supported by the bed body. Or the extruding portion may be formed in one body with the horizontally guiding rail. The works stocking means may be fixed with the bed body. The turret is rotatably and angles-of-rotation-dividably mounted on the turret support. A work hand is provided with the turret or the turret support in order to discharge the works.

A machining system of a lathe according to the present invention comprises double machine-portions, the one portion of which forms a first vertical lathe, and the other portion of which forms a second vertical lathe. The machine-portions are located so that the horizontally guiding rail of the one machine-portion in series continues with the other horizontally guiding rail of the other machine-portion.

The machining system may comprise a works stocking means for stocking works. The works stocking means may be located between the bed body of the one machine-portion and the bed body of the other machine portion. The works stocking means is desirably situated near at the horizontal connecting rail, which continuously connects the horizontally guiding rail of the one machine-portion with the horizontally guiding rail of the other machine-portion.

A lathe or a machining system of a lathe further comprises a reversing means for reversing each of works, wherein the works are placed on the works stocking means. The reversing means may be located near at the works stocking means. Each of the lathes is almost the same as the above mentioned lathe.

The lathe or the system has a pair of the head stock supporting support surfaces which are located on both opposite portions that are mutually opposite with respect to the given vertical surface. Single head stock may be mounted on the one portion of the opposite portions. Double head stocks are respectively mounted on the both opposite portions.

A machining system is formed of the above mentioned first lathe in combination with the above mentioned second lathe, which is different from the first lathe. The machining system further comprises a horizontal connecting rail for connecting the first lathe with the second horizontally guiding rail.

The lathe or each of the lathes of the machining system has a concave surface which is formed near at the above mentioned vertical surface of the base body, wherein the upper portion of the concave surface inclines in the direction oriented to the horizontally guiding rail from the lower portion of the concave surface so that the width of the swinging area of the turret is wider.

The lathe or each of the lathes comprises tools, a pair of tool supports for supporting the tools. Each of the respective tool support surfaces of the tool supports is attached with the above mentioned vertical surface. The tool supports are respectively mounted on both opposite portions that are mutually opposite with respect to the given vertical surface. A concave surface is formed between the respective tool support surfaces. The upper portion of the concave surface inclines in the direction oriented to the horizontally guiding rail from the lower portion of the concave surface.

BRIEF DESCRIPTION OF THE DRAWINGS

FIG. 9, FIG. 9A and FIG. 9B illustrates another embodiments of a main spindle-moving-type of vertical lathe, wherein tools T are placed with constant intervals on a gang tooling type of tool support, FIG. 9 (A) being a side view thereof, and FIG. 9 (B) being an enlarged view of the tool support.

DESCRIPTION OF THE INVENTION

Figure 1:
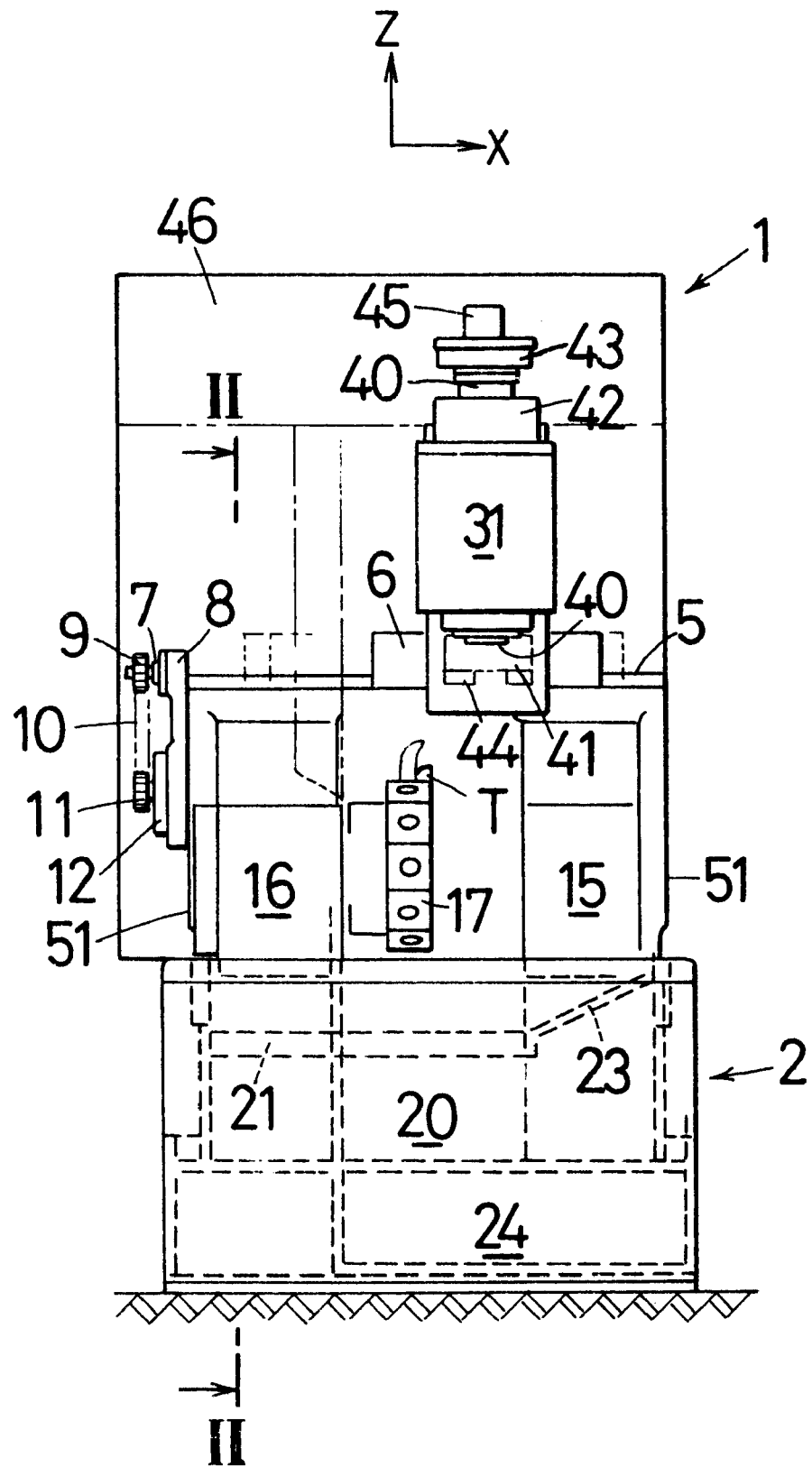
FIG. 1 is a front view of the first embodiment of a main spindle-moving-type of vertical lathe according to the present invention.
Figure 2:
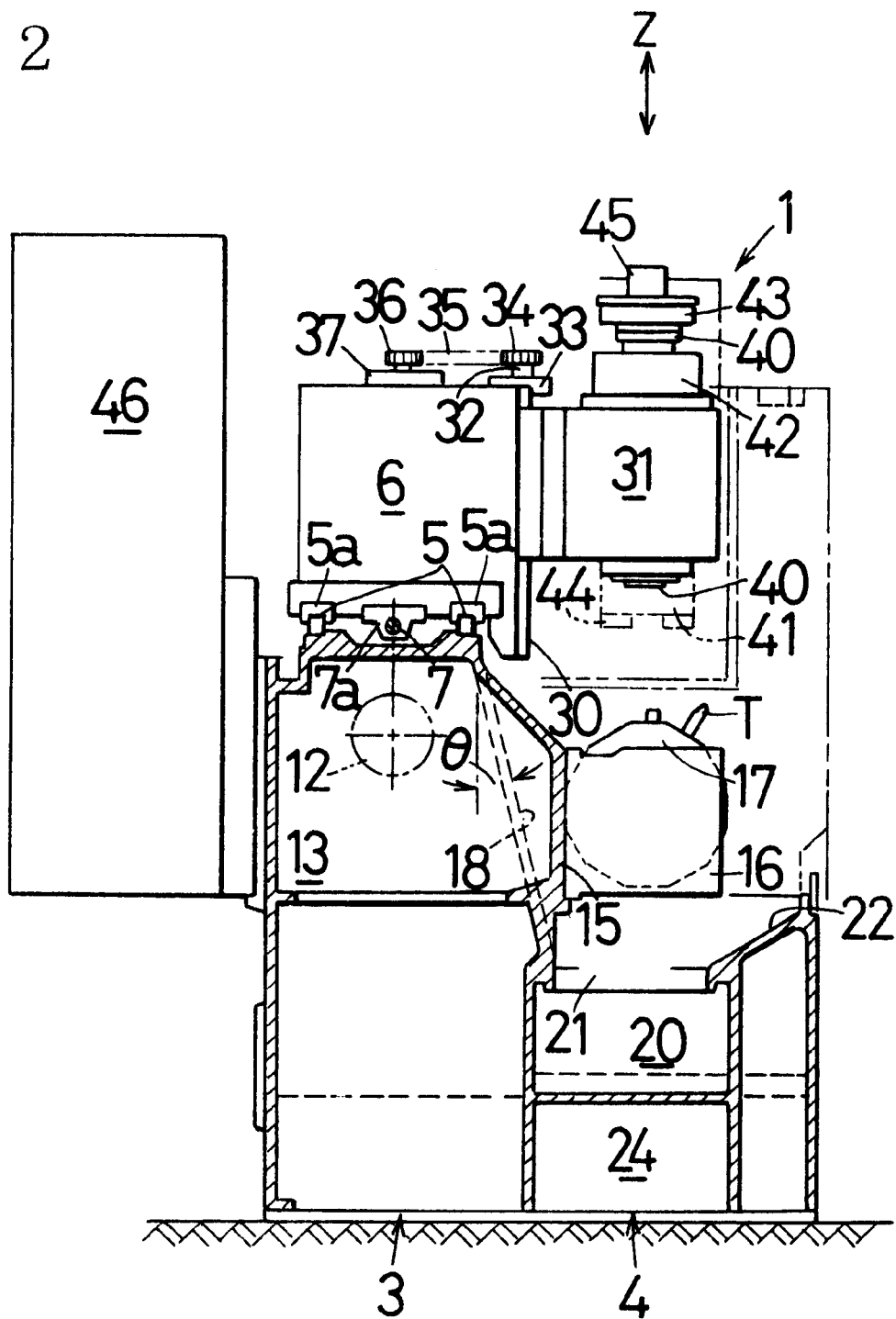
FIG. 2 is a sectional view cut off at the line II—II of FIG. 1.

Embodiments according to the present invention are explained in what follows. FIG. 1 shows a front view of a first embodiment of a main spindle-moving-type of lathe 1 such as a vertical lathe according to the present invention 1. FIG. 2 is a sectional view of FIG. 1 at II—II line. The main spindle-moving-type of lathe 1 comprises a bed body 2 which is identical with the main body thereof. Bed body 2 has one vertical surface or two vertical surface, to which a turret is attached. The main body generally gives rigidity to the machine Bed body 2 generally includes a box-like rear body portions or a rear body portion 3 and box-like front body portions 4 extending from both sides thereof. Each of box-like front body portions 4 may be formed in a body with rear body portion 3. The top of box-like front body portion 4 is lower in height in the vertical direction than the top of rear body portion 3.

Rear body portion 3 has rail of a linear rolling guiding mechanism. The rail has a pair of X-axis guiding surfaces 5 which is identical with the top surface of the rail. X-axis guiding surfaces 5 are formed as they are two lines of surfaces. X-axis guiding surfaces 5 extend in the X-axis direction. A movable support 6 is movably mounted in the X-axis direction on X-axis guiding surfaces 5 through a multiple of rolling guiding bodies 5a. The linear rolling guiding mechanism includes X-axis guiding surfaces 5 and rolling guiding bodies 5a. X-axis guiding surfaces 5 are formed as the guiding surface of the horizontally guiding rail. A X-axis directional feed screw 7 for driving a movable support 6 is located at generally the middle position between and along X-axis guiding surfaces 5. A nut 7a, which is fixed with movable support 6, is screwed into X-axis directional feed screw 7.

One end portion of X-axis directional feed screw 7 is rotatably supported by a roller bearing (not shown), which is fixed with a bearing support bracket 8. The other end portion of X-axis directional feed screw 7 is rotatably supported by another roller bearing (not shown), which is fixed with bed body 2. A toothed pulley 9 is fixedly mounted on the tip portion of X-axis directional feed screw 7. Toothed pulley 9 is engage with a toothed belt 10. Toothed belt 10 is engaged with another toothed pulley 11, which is fixed with the power output shaft of an X-axis servomotor 12.

X-axis servomotor 12 is located inside a cavity formed inside rear body portion 3. X-axis servomotor 12 is fixed with a bearing support bracket 8. X-axis servomotor 12 is driven to rotate toothed pulley 11, toothed belt 10, toothed pulley 9, and X-axis directional feed screw 7 in that order. X-axis directional feed screw 7, which is screwed into nut 7a fixed with movable support 6, drives movable support 6 on X-axis guiding surfaces 5. Such movement of movable support 6 is identical with the X-axis directional movement of a turret 17 which relates to the set of tools T.

Bearing support bracket 8, which is attached on the side surface 51 of one of the half-portions of rear body portion 3 may be attached to the other side surface of the opposite half-portion of rear body portion 3. The other X-axis transferring mechanism which comprises bearing support bracket 8, X-axis servomotor 12, toothed pulley 11, toothed belt 10, and a timing pulley may be attached to the other surface 51 of the rear body portions.

The front surface of rear body portion 3 is one and the same as a pair of turret surfaces 15 is divided into two surfaces. One of turret support attaching surfaces 15 is available for the right hand's convenience or the left hand's convenience. Turret support attaching surfaces 15 may be non-symmetrical. One or both of turret support attaching surfaces 15 is/are used in correspondence to the process line, the situation of the factory, the circumstance of the floors of the factory, and so on.

Turret 17 is angle-of-rotation-dividably provided with turret support 16. Turret 17 is fixed at a certain position, the degree of angle movement being divided respectively. Tools T are provided with turret 17, and respectively situated on the circular line around of the center line of turret 17. An even surface is formed as the front surface of the middle portion of rear body portion 3. It is preferable that level surface 18 is identical with a vertical surface or close to a vertical surface.

It may be preferable that level surface 18 is beveled at a certain angle given in relation to a vertical surface under the condition where rear body portion 3 is box-likely formed, and the form of rear body portion 3 facilitate chips (or cut materials) which are cut from a work to fall smoothly. Level surface 18 is concavely formed so that level surface 18 is concave with respect to turret support attaching surfaces 15. That is, the horizontal distance between the upper portion of level surface 18 and X-axis guiding surfaces 5 is shorter than the component of the distance between the lower portion of even surface 18 and X-axis guiding surfaces 5. Such a concave shape of level surface 18 facilitates enlargement of the sphere of operation of turret 17.

Box-like front body portion 4 is formed into a body with rear body portion 3 on the front thereof. Box-like front body portion 4 forms a cut materials discharging space 20 so that it receives cut materials which are discharged during cutting processing, and the cut materials are discharged into discharging space 20 out of the rear portion or the side portion of base body 2 by a discharging means. Cut materials discharging space 20 is rectangular as seen in a sectional view. The upper portion of cut materials discharging space 20 opens with an opening 21 formed at the top thereof. The cut materials produced during processing of cutting directly fall into cut materials discharging space 20 passing through opening 21 together with cutting oil remains.

Other cut materials, which fall around opening 21, are guided on and by the bevel surfaces 22 and 23, and fall into cut materials discharging space 20. A filter (not shown) is provided on the bottom of cut materials discharging space 20. The cut materials are separated from the cutting oil remains. The separated cutting oil remains fall into a cutting oil gathering space 24. The gathered cutting oil is circulatively moved towards the working processing portion, and are recyclably available.

A pair of Z-axis guiding surfaces 30, which are perpendicular to X-axis guiding surfaces 5, is formed at the front of movable support 6. Z-axis guiding surfaces 30 extrudes in the Z-axis direction. Z-axis guiding surfaces 30 are identical with the top surface of the rolling guiding mechanism. A head stock 31 is movably mounted on Z-axis guiding surfaces 30 on a multiple number of rolling guiding bodies (not shown) which are located on the line oriented in the Z-axis direction. A Z-axis directional feed screw 32 is located at generally the middle position between and along Z-axis guiding surfaces 30. A nut 7*a*, which is fixed with head stock 31, is screwed into Z-axis directional feed screw 32. The one end portion of Z-axis directional feed screw 32 is rotatably supported by a roller bearing (not shown), which is fixed with a bearing support bracket 33.

The other end portion of Z-axis directional feed screw 32 is rotatably supported by another roller bearing (not shown), which is fixed with movable support 6. A toothed pulley 34 is fixedly mounted on the tip portion of Z-axis directional feed screw 32. Toothed pulley 34 is engaged with a toothed belt 35. Toothed belt 35 is engaged with another toothed pulley 36, which is fixed with the power output shaft of Z-axis servomotor 37.

Z-axis servomotor 37 is located inside a cavity formed inside movable support 6. Z-axis servomotor 37 is driven to rotate another toothed pulley 36, toothed belt 35, toothed pulley 34, and Z-axis directional feed screw 32 in that order. Z-axis servomotor 37, which is screwed into the nut fixed with head stock 31, drives head stock 31 on Z-axis guiding surfaces 30.

A main spindle 40 is rotatably provided with head stock 31. The axis line of main spindle 40 is oriented in the Z-axis direction. Main spindle 40 is rotatably driven by a built-in motor which is built inside head stock 31. On the lower portion of main spindle 40 is removably mounted a work holding chuck 41 such as a three or four jaws-type of hydraulic chuck, or a collet chuck. On the upper portion 42 of head stock 31 is mounted a retainer work holding chuck 41. Inside a retainer is incorporated an encoder for detecting the speed of the built-in motor. The encoder, work holding chuck 41 and so on, which are well-known, are left out of explanation.

The upper portion of main spindle 40 is provide with chuck cylinder 43. Chuck cylinder 43 includes a driving cylinder for driving a pair of work holding jaws 44, which holds and releases a work. The upper portion of chuck cylinder 43 is provided with a rotary joint 45 for providing the pressured oil for chuck cylinder 43 from hydraulic power oil unit. Rotary joint 45 has a circumferential portion, which is prevented from rotating by a rotation prohibiting means (not shown). During rotation of main spindle 40, the axle-side portion of rotary joint 45 rotates, while the circumferential portion of rotary joint 45 does not rotate.

The rear portion of rear body portion 3 is provided with a controlling console having an NC means, a programmable controller (not shown), and so on.

In the first embodiment, the NC means starts to operate, and X-axis servomotor 12 is driven moving movable support 6, and work holding chuck 41 to the position of the works stocking means (not shown). With chuck cylinder 43 being driven, work holding chuck 41 holds a work to be processed. Turret 17 turns to a designated position of the angle of rotation in order that it selects a desired tool T.

The drive of rotation of X-axis servomotor 12 leads the rotation of toothed pulley 11, toothed belt 10, toothed pulley 9, and X-axis directional feed screw 7. The drive of rotation of X-axis directional feed screw 7 leads movable support 6 to a linear movement on X-axis guiding surfaces 5, while the drive of rotation of Z-axis servomotor 37 makes the rotation of Z-axis directional feed screw 32 lead head stock 31 to a linear movement on Z-axis guiding surfaces 30.

The control of X-axis servomotor 12 and Z-axis servomotor 37 lead the tool to the movement on the course of lines including interpolated linear lines and interpolated circular lines with the velocity of the tool being controlled. The work is desirably processed by the control of velocity of rotation of main spindle 40. The cut materials generated by the processing and the cutting oil fall into discharging space 20. Front body portion 4 and rear body portion 3 are heated by the heat of the cut materials and the cutting oil.

The cutting oil which is provided between the work and the tool T cool the tip portion of the tool T. Reversely the temperature of the cutting oil gradually increases. The heat due to the cutting oil and the cut materials heats turret support attaching surfaces 15 and level surface 18. The heat deforms and distorts rear body portion 3.

The respective heated portions of rear body portion 3 and X-axis guiding surfaces 5 are slightly deformed and distorted so that the respective heated portions are convexly formed in shape in the Y-axis direction as the horizontal surface is seen from a vertical direction. In other words, the middle portion of rear body portion 3 bends in the Y-axis direction in relation to both side portions of rear body portion 3. The tool T forces the work in the X-axis direction, because of the direction of deformation or distortion and the direction of the force, the thermal deformation has little influence on the accuracy of machining such as cutting. On the other hand, head stock 31 bends in relation to turret support 16 as seen from the side. In other words, head stock 31 bends downwards towards turret 17. Because of the direction of the bending and the above-mentioned direction of the force, the thermal deformation has little influence on the accuracy of machining such as cutting.

Figure 3:
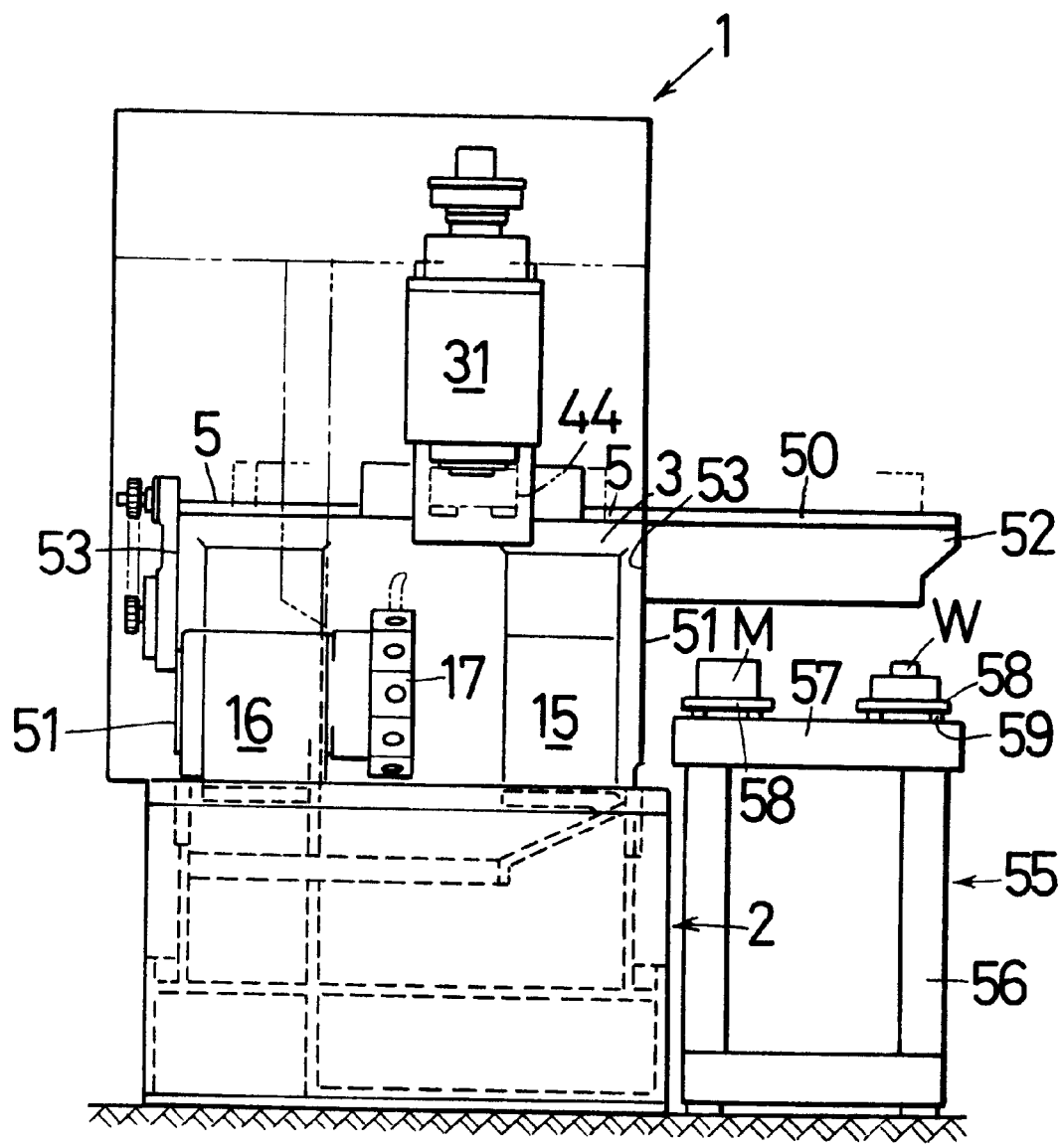
FIG. 3 is a front view of the second embodiment of a main spindle-moving-type of vertical lathe according to the present invention.

FIG. 3 illustrates a second embodiment of a main spindle-moving-type of lathe named a vertical lathe according to the present invention. X-axis guiding surfaces 5 on bed body 2 of the first embodiment are formed within rear body portion 3; thereby head stock 31 is not able to move over rear body portion 3. X-axis guiding surfaces of the second embodiment of the main spindle-moving-type of lathe 1 are extruded beyond the one end of bed body 2, thereby head stock 31 moves beyond bed body 2. The pair of work holding nails 44 of head stock 31 can transfer works outside bed body 2, and introduce works into bed body 2.

On rear body portion 3 is mounted an extruded X-axis horizontally guiding rail 50, which has an extruded X-axis guiding surface thereon. The extruded X-axis guiding surface continuously connects with X-axis guiding surfaces 5. Extruded X-axis horizontally guiding rail 50 is supported by an extruded support 52. Extruded support 52 is fixedly attached with an extruded rail support surface 53 which is one and the same as one of the side surfaces 51 of rear body portion 3. Extruded rail support surface 53 forms the surface so that extruded support 52 is removably attached with rear body portion 3. Rear body portions 3 have one more extruded X-axis guiding surface 53, which is identical with the other side surface 51. The ends of the internal thread open at extruded rail support surface 53.

Extruded X-axis horizontally guiding rail 50 and extruded support 52, which are separated from bed body 2 which is identical with the main body of the lathe, may have a rigidity which is lower than that of bed body 2. The separation makes the accuracy of machining better. On the side of bed body 2 is fixedly located a works stocking means 55 for providing and charging works. The works stocking means 55, which includes a chain-linked palette, stocks both processed works W and non-processed material M.

The general mechanical structure of works stocking means 55 is known through Japanese Model Disclosure (laid-open) No.Heisei 2-53337, Japanese Patent Disclosure (laid-open) No.Heisei 5-192841, and so on. As known based on the disclosure, a single material M or a single work W is single-layered, or materials M or works W are many-layered. The main body 56 of works stocking means 55 may be removably fixed by bolts on the side surface 51 (not shown) of rear body portions 3.

A multiple number of palettes 58 are placed on the top surface 57 of main body 56. Palettes 58 are mutually linked to one another by a chain. Machined or processed works W or non-processed materials M are placed on each of the palettes. A multiple number of casters 59, such as three casters or four casters are attached on the lower surface of each of palettes 58. Casters 59 are for rolling palettes on top surface 57.

The chain which links the palettes to one another is driven by sprockets engaged therewith. One of the sprockets, which is driven by a driving motor, determines one of the positions at which a work W or a material M is provided or discharged. A material transferred on extruded X-axis horizontally guiding rail 50 to head stock 31, which holds a material with a pair of work holding jaw 44, and after processing returns the processed work to the vacant position of one of the palette.

The main spindle-moving-type of lathe 1 according to the second embodiment has one function wherein head stock 31 provides and discharges works by movement thereof, and another function wherein works stocking means 55 stocks works. That is, the main spindle-moving-type of lathe 1, which has an automatic function for providing works for itself as a machine tool does makes up a machining cell.

Figure 4:
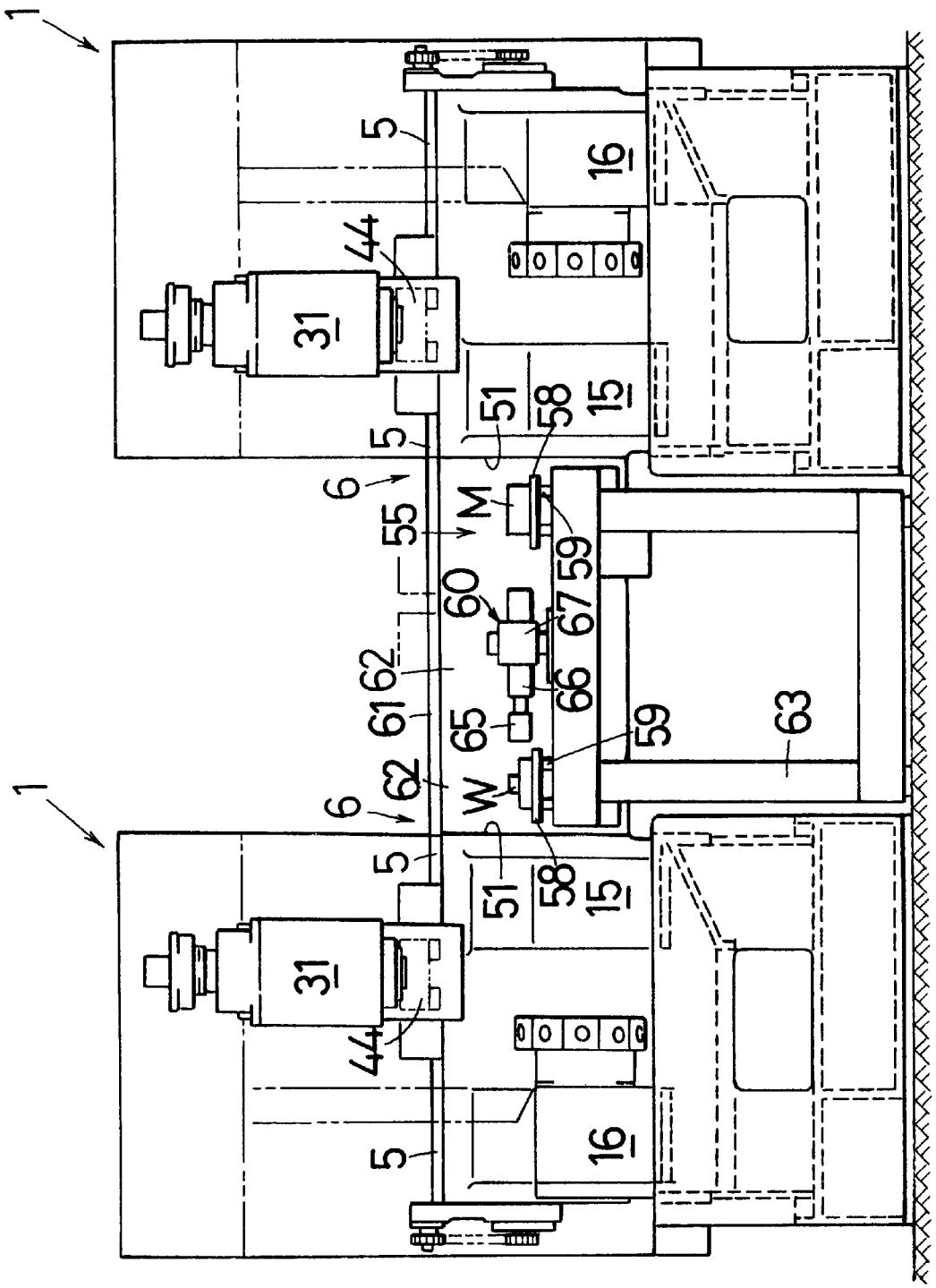
FIG. 4 is a side view of the third embodiment of two main spindle-moving-type of vertical lathes according to the present invention, wherein a works stocking means and a work reversing means are located at the middle portion therebetween.

FIG. 4 illustrates a third embodiment of a machining system of a lathe such as a vertical lathe according to the present invention. The machining system of the lathe comprises a pair of lathes 1. The first lathe 1 is situated in parallel with the second lathe 1. A works stocking means 55 and a work reversing means 60 are located between the lathes 1. A horizontally connecting X-axis guiding rail 61 is located between X-axis guiding surfaces 5 of the one lathe 1 and X-axis guiding surfaces 5 of the other lathe 1. The extruded X-axis guiding surfaces of horizontally connecting X-axis guiding rail 61 continuously connects with both pairs of X-axis guiding surfaces 5 of both lathes 1. Horizontally connecting X-axis guiding rail 61 is supported on a support 62. Support 62 is fixed with side surface 51 of rear body portion 3 by a fixing means such as bolts.

Each of the lathes 1 includes a head stock 31, which is movable on horizontally connecting X-axis guiding rail 61 so that a pair of work holding fingers or work holding jaws 44 of head stock 31 can provide and discharge works W or materials M by using pair of work holding nails 44. The main body 63 of a works stocking means 55 is located between the two lathes 1. Work reversing means 60 is for holding and reversing a work on one of the palettes 58.

The material M, which is held by the pair of work holding nails 44, is processed only on one side. The work W, the one side portion of which had been processed, is transferred onto the pallete 58 of works stocking means 55. The hand 65 of work reversing means 60 holds the processed work W. Hand 65 is loaded with an advancing and retracting arm 66.

Advancing and retracting arm 66 is driven by advancing and retracting arm driving means 67. The motion of advancing and retracting arm 66 includes an advancing-and-retracting movement in the direction of the axis of advancing and retracting arm 66, an upward-and-downward movement, a rotational movement around a vertical axis, and a rotational movement around the axis of advancing and retracting arm 66 so that a work W advances and retracts between the holding position where hand 65 can hold the work W on the pallete and the retracting position where the work W retracts so that it does not interfere with palettes 58 when they move on main body 63, the holding position being able to be adjusted by the upward-and-downward movement of hand 65 in correspondence to the position of the work, and then the work W being able to be reversed by the rotational movement of hand 65.

The process of the machining system of a lathe may include a machining process having the same machining of two works by the two lathes 1 in parallel, or a machining process having a former machining carried by the first lathe 1 with a latter machining being done by the second lathe 1 after reversing the work by work reversing means 60.

Figure 5:
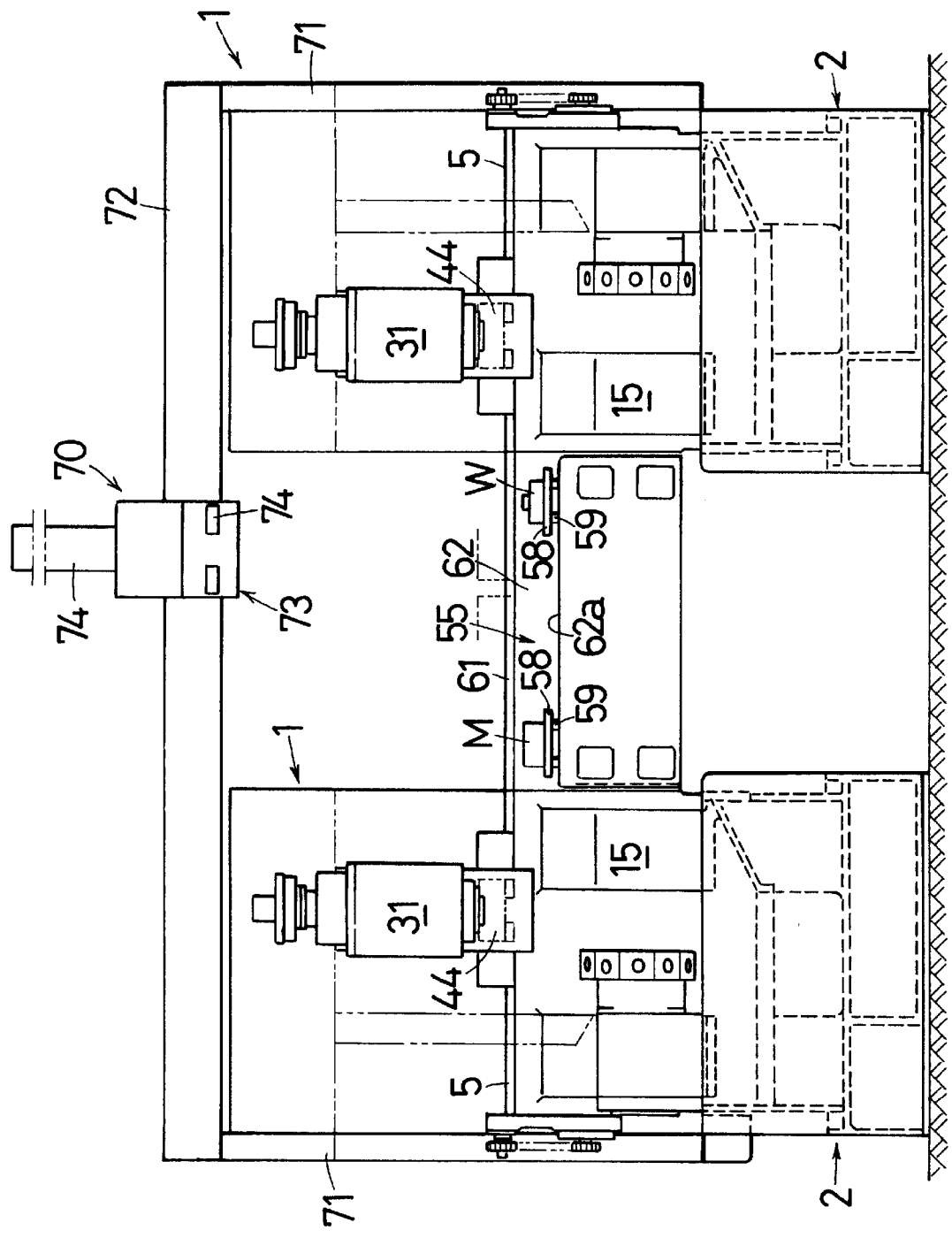
FIG.5 is a side view of the fourth embodiment of a machining system of a lathe comprising two main spindle-moving-type of vertical lathes according to the present invention, wherein a works stocking means is located at the middle portion therebetween and a reversing means is located on the upper portion thereof.

FIG.5 illustrates a machining system of a lathe comprising a pair of lathes 1. A works stocking means 55 is located between lathes 1 such as vertical lathes, and a work reversing means 70 of the fourth embodiment is located on the upper side, while work reversing means 60 of the third embodiment is located at the middle portion of the vertical lathe 1.

A rail 72 is located within the lathes 1. Both the end portions of rail 72 are respectively supported by two supporting pillars 71, which stand on bed body 2. On rail 72 is upward-and-downward-movably mounted a hand means 73, which is upwardly and downwardly moved by means of an upwardly-and-downwardly driving cylinder 74. Hand means 73 has a pair of finger which holds a work W or a material M. When the work W or the material M is to be reversed, upwardly-and-downwardly driving cylinder 74 is driven and hand means 73 is so upwardly and downwardly moved.

The function of hand means 73 is the same as that of the above described work reversing means 60. On the top surface 62a of support 62, which connects one of the lathes 1 with the other of the lathes, are mounted palettes 58 of works stocking means 55, a chain (not shown), a sprocket (not shown), a driving motor (not shown), and so on. The function of works stocking means 55 is described above.

Figure 6:
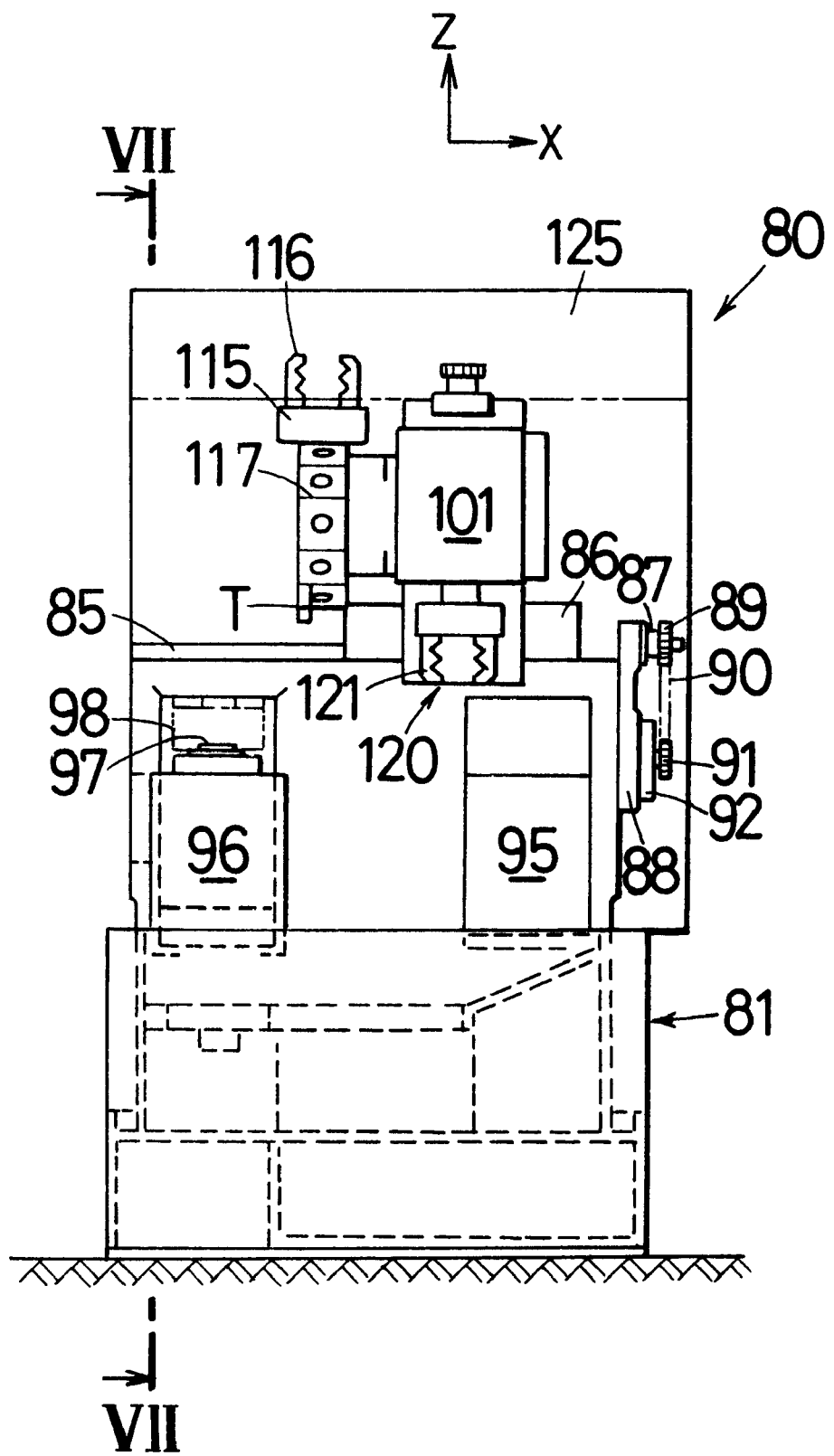
FIG.6 is a front view of the fifth embodiment of a fixed main spindle type of vertical lathe according to the present invention.
Figure 7:
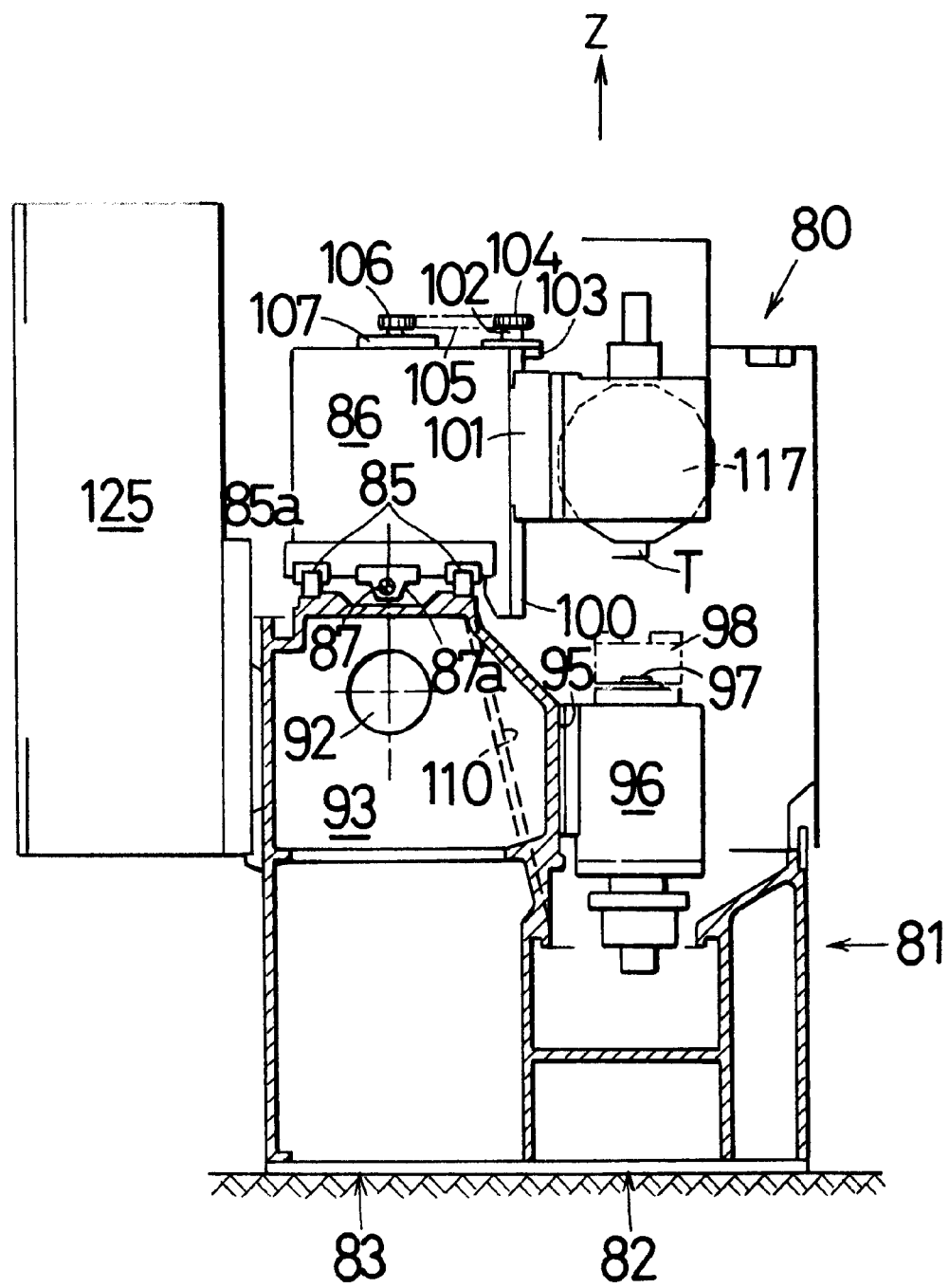
FIG.7 is a sectional view cut off at the line VII—VII of FIG.6.

FIG.6 illustrates the fifth embodiment of a fixed main spindle type of vertical lathe 80 according to the present invention. FIG.7 is a sectional view of FIG.6 cut off at the VII—VII line of FIG.6. A bed body 81 of the fixed main spindle type of vertical lathe 80 constructs a supporting structure. The structure of bed body 81 is generally identical with that of the above mentioned main spindle-moving-type of vertical lathe 1. Bed body 81 includes a front body portion 82 and a rear body portion 83. The detailed description of bed body 81 is omitted.

A pair of X-axis guiding surfaces 85 is formed to extrude in the X-axis direction on the top surface of rear body portion 83. A transferring support 86 is movably mounted on X-axis guiding surfaces 85 in the X-axis direction through a multiple number of rolling guiding bodies 85a. A linear rolling guiding mechanism comprises X-axis guiding surfaces 85 and rolling guiding bodies 85a. A X-axis directionally sending screw 87 is located at the middle position between the two lines of the X-axis guiding surfaces 85.

X-axis directionally feeding screw 87 is screwed into a nut (not shown) which is fixed with transferring support 86. The one end portion of X-axis directionally feeding screw 87 is rotatably supported by a bearing (not shown) which is inserted inside a bearing bracket 88, the bearing bracket being fixed on the side surface 94 of rear body portion 83.

The other end portion of X-axis directionally feeding screw 87 is rotatably supported by a bearing (not shown) which is inserted inside rear body portion 83. A toothed pulley 89 is fixed with the tip portion of X-axis directionally feeding screw 87. Toothed pulley 89 engages with a toothed belt 90. Toothed belt 90 engages with a toothed pulley 91, which is fixed with the power output shaft of a X-axis servomotor 92.

X-axis servomotor 92 is located within a cavity 93, which is formed within rear body portion 83. When X-axis servomotor 92 is driven, toothed pulley 91, toothed belt 90, toothed pulley 89, and X-axis directionally feeding screw 87 are driven in that order. X-axis directionally feeding screw 87, which is inserted and screwed into nut 87a fixed with transferring support 86, transfers transferring support 86 on X-axis guiding surfaces 85.

Rear body portion 83 has main spindle supporting support surfaces 95, each of which is a vertical surface. Each of main spindle supporting support surfaces 95 is identical with the front surface of rear body portion 83. Main spindle supporting support surfaces 95 are available for mounting a head stock 96 on rear body portion 83. Head stock 96 is mounted on either of the main spindle supporting support surfaces 95. Either of the main spindle supporting support surfaces 95, being selected in correspondence to the facilities of the factory, the process line, and so on, is available for convenience of either the right hand or the left hand.

Head stock 96 includes a main spindle 97 for rotating a work around the Z-axis. Main spindle 97 is driven and rotated by a built-in motor (not shown) internalized into head stock 96. A work holding chuck 98 is removably mounted on the upper side of main spindle 97. The internal structure of head stock 96, which is substantially the same as that of head stock 31 of the first embodiment, is omitted in explanation.

A pair of lines of Z-axis guiding surfaces 100, which are one and the same as the front surface of transferring support 86, is formed in the Z-axis direction. A turret support 101 is movably mounted on Z-axis guiding surfaces 100 through a multiple number rolling guiding bodies (not shown), which are included in a linear rolling guiding mechanism. A Z-axis directional feed screw 102 is located at generally the middle position between and along Z-axis guiding surfaces 100. A nut 7a, which is fixed with turret support 101, is screwed into Z-axis directional feed screw 102. One end portion of Z-axis directional feed screw 102 is rotatably supported by a roller bearing (not shown), which is inserted inside a bearing support bracket 103.

The other end portion of Z-axis directional feed screw 102 is rotatably supported by another roller bearing (not shown), which is fixed with transferring support 86. A toothed pulley 104 is fixedly mounted on the tip portion of Z-axis directional feed screw 102. Toothed pulley 104 is engaged with a toothed belt 105. Toothed belt 105 is engaged with another toothed pulley 106, which is fixed with the power output shaft of Z-axis servomotor 107.

Z-axis servomotor 107 is located inside a cavity which is formed inside transferring support 86. Z-axis servomotor 107 is driven to rotate another toothed pulley 106, toothed belt 105, toothed pulley 104, and Z-axis directional feed screw 102 in that order. Z-axis directional feed screw 102, which is screwed into a nut fixed with turret support 101, driver turret support 101 on Z-axis guiding surfaces Turret 117 is angle-of-rotation-dividably provided with turret support 101. Tools T are provided with turret 117, and respectively situated on the circumference of the circle around the center line of turret 117. Tools T are oriented in the radial direction. A work holding mechanism 115 is mounted on one side surface of turret 117. Work holding mechanism 115 has a pair of holding fingers 116. Holding fingers 116 holding a material M or a processed work W which is stocked in a works stocking means (not shown) gives it to work holding chuck 98 to chuck it, or the work which is held by work holding chuck 98 is received in order to give it again to work holding chuck 98 to chuck it.

As shown in FIG.6, a work holding mechanism 120 may be mounted on the lower surface of turret support 101 in order to machine a larger size of work without using the one surface of turret 117. Work holding mechanism 120 has a pair of holding fingers 121, which holds a material M or a processed work W which is stocked in a works stocking means (not shown) in order to give it to work holding chuck 98 to chuck it.

An level surface 110 is formed on the middle portion of the front portions of rear body portion 83. Level surface 110 is desirably formed as a vertical surface or a generally vertical surface. It is preferable that level surface 110 is beveled at a certain angle given in relation to a vertical surface under the condition where bed body 2 is box formed, and the form of bed body 2 facilitates the smooth falling of the cut materials which are cut from a work. Level surface 10 may be slightly curved. Further it may be concavely formed so that level surface 110 is concave with respect to main spindle supporting support surfaces 95. That is, the horizontal distance between the upper portion of level surface 110 and X-axis guiding surfaces 85 is shorter than the horizontal distance between the lower portion of even surface 101 and X-axis guiding surfaces 85.

The operation of the fifth embodiment is explained as below. When the NC means is started, the operation of machining begins. When turret support 101 is first moved, the pair of the holding fingers of work holding mechanism 120 holds a material M which is stocked in a works stocking means (not shown), and gives it to work holding chuck 98 to chuck it.

Next, turret 117 is rotated to a position having an angle of rotation so that it takes a desired tool. When X-axis servomotor 92 is driven, toothed pulley 91 of X-axis servomotor 92, toothed belt 90, toothed pulley 89, and X-axis directionally feeding screw 87 are driven in that order. The rotation of X-axis directionally feeding screw 87 moves transferring support 86 on X-axis guiding surfaces 85.

The drive of Z-axis servomotor 107 drives Z-axis directional feed screw 102 with turret support 101 being moved on Z-axis guiding surfaces 100. The control of X-axis servomotor 92 and Z-axis servomotor 107 moves the tool on the course of lines including interpolated linear lines and interpolated circular lines. The work is desirably processed as described above; therefore, thermal deformation and distortion has no bearing with respect to the accuracy of machining.

When one side portion of the work is processed, holding fingers 121 of work holding mechanism 120 reverse the work W in order to give it to work holding chuck 98 to chuck it again. Once again, control of X-axis servomotor 92 and Z-axis servomotor 107 moves the tool to on the course of lines including interpolated linear lines and interpolated circular lines. After being machined, the machined work is discharged into the works stocking means by work holding mechanism 120.

Figure 8:
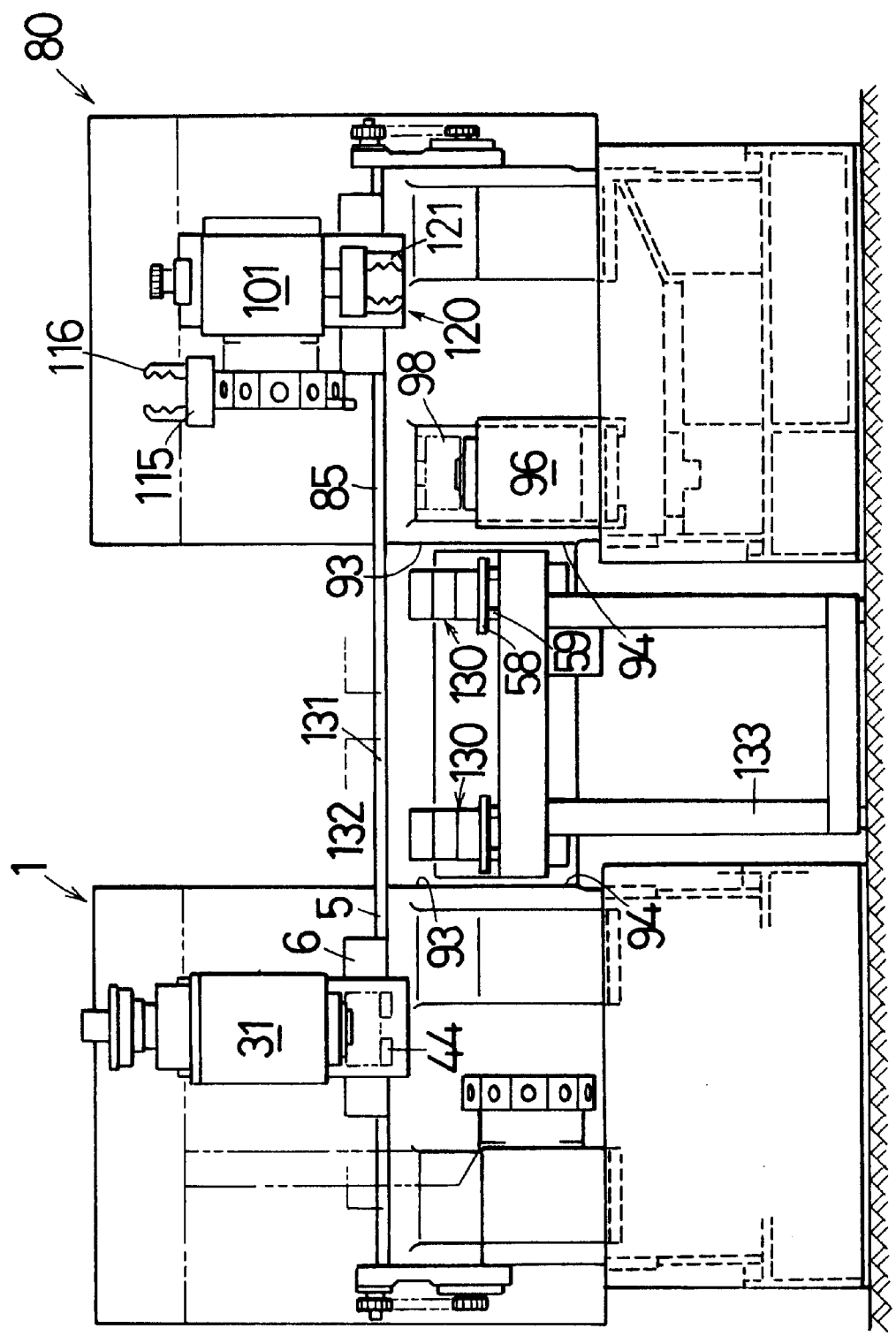
FIG. 8 is a side view of the sixth embodiment of a machining system comprising the first embodiment of a main spindle-moving-type of vertical lathe and the fifth embodiment of a fixed main spindle type of vertical lathe according to the present invention, wherein a works stocking means is located at the middle portion therebetween.

FIG.8 illustrates a sixth embodiment of a machining system of a lathe according to the present invention. The lathe comprise a first lathe which is identical with a first embodiment of a main spindle-moving-type of a vertical lathe and a second lathe which is identical with a fifth embodiment of a fixed main spindle type of a vertical lathe, wherein a works stocking means 130 is located at the middle position of the lathes. A connecting X-axis guiding rail 131 is located between X-axis guiding surfaces 5 of main spindle-moving-type of a vertical lathe 1 and X-axis guiding surfaces 85 of fixed main spindle type of a vertical lathe 80. X-axis guiding surfaces 5 of main spindle-moving-type of a vertical lathe 1 are extruded towards fixed main spindle type of a vertical lathe 80.

Connecting X-axis guiding rail 131 is supported by a support 132, the surface of which is attached with on extruded rail support surface 93 by a fixing means such as bolts, extruded rail support surface 93 being formed as a side surface 94 of rear body portion 83. The head stock 31 of main spindle-moving-type of a vertical lathe 1 and turret support 101 of fixed main spindle type of a vertical lathe 80 are respectively movable on connecting X-axis guiding rail 131. Thereby works W or materials M are provided and discharged by work holding jaw 44 of head stock 31 or work holding mechanism 120 of turret support 101.

A main body 133 of works stocking means 130 is located between main spindle-moving-type a vertical lathe 1 and fixed main spindle type of a vertical lathe 80. Pallets 58 of works stocking means 130 are placed on main body 133. Main spindle-moving-type of a vertical lathe 1 has the above mentioned machining. Such a processed work is returned to works stocking means 130. Next, turret support101 is moved, and holding fingers 121 of work holding mechanism 120 hold the processed work W which is stocked in works stocking means 130 in order to give it to work holding chuck 98 to chuck it.

The works may be given from work holding jaws 44 of head stock 31 to work holding chuck 98 of head stock 96, wherein head stock 31 moves on X-axis guiding surfaces 5, connecting X-axis guiding rail 131 and X-axis guiding surfaces 85. Next, turret 117 is rotated to a position having an angle of rotation so that it takes a desired tool, and processes the work according to the above described operation. When the machining is finished, work holding mechanism 115 or 120 discharges the processed work into works stocking means 130. As such, works are desirably machined by main spindle-moving-type of a vertical lathe 1 in cooperation with fixed main spindle type of a vertical lathe 80.

Figure 9A:
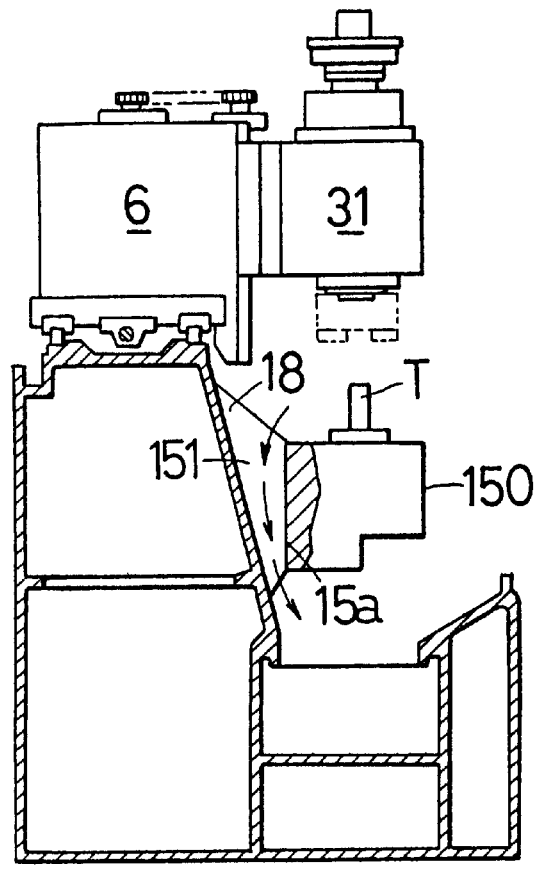
Figure 9B:
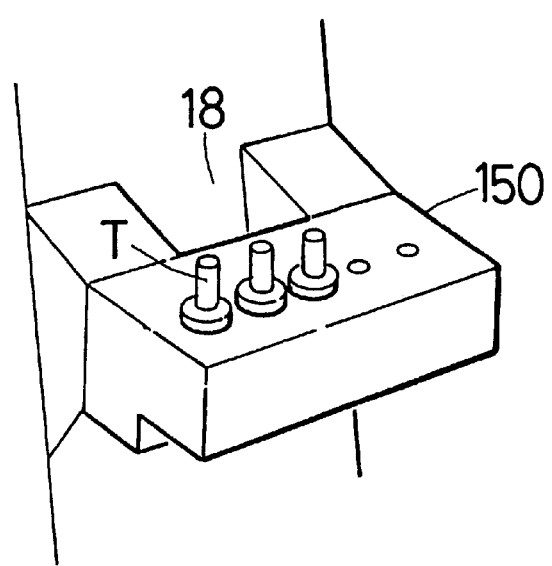

FIG.9 illustrates other embodiments of main spindle-moving-type of a vertical lathe 1, wherein tools T are situated on a single line or two parallel lines within a gang tooling type of tool support 150. Tool support 150 is mounted on both sides of tool support surfaces 15a, which are respectively one and the same as vertical surfaces. A larger volume of space 151 is formed between level surface 18, which is one and the same as the front surface of bed body 2, and tool support 150. Space 151 facilitates the falling of cut materials into the downward side opening 21. Main spindle-moving-type of a vertical lathe 1 has a long stroke in the X-axis direction so that the tools are lined up in a line.

Turret support 16 of the embodiment 1 is attached with either of the two of turret support attaching surfaces 15. Both the two lines of X-axis guiding surfaces 5 and the two lines of X-axis guiding surfaces 85 respectively form single planes. In other words, the two lines of X-axis guiding surfaces 5 are included in a single horizontal plane, as the two lines of 85 are included in a single horizontal plane. However, the two lines of X-axis guiding surfaces 5 may be included in respective planes, and the two lines of X-axis guiding surfaces 85 may be included in respective planes.

The linear guiding mechanism, the X-axis guiding rail and Z-axis guiding rail which forms the X-axis guiding surface and the Z-axis guiding surface respectively, is shown as the rolling guiding mechanism, but it may be provided as a sliding guiding mechanism which forms sliding guiding surfaces. Front body portion 4 and front body portion 82 are not necessary for the body of a machining tool if chips and cutting oil are disposed by other means.

Work holding mechanism(s) 115 placed on turret 117 or work holding mechanism(s) 120 placed on turret support 101 of the fifth embodiment is/are attached on the surface of one side, but may not be attached on the surfaces of both sides. In the third embodiment and the fourth embodiment, there are provided two vertical lathes, but more than two lathes are may be provided.

In the second embodiment, the rail having X-axis guiding surfaces 5 is shown as it is separated from extruded X-axis horizontally guiding rail 50, but the rail having both X-axis guiding surfaces 5 and extruded X-axis horizontally guiding rail 50 is formed in a body to become a longer rail.

In the fifth embodiment, no extruded rail is provided with X-axis guiding surfaces 85, but there may be provided an extruded X-axis rail and a works stocking means as shown in the second embodiment.

A lathe according to the present invention has automatical operation with both sides of a work being machined by a single unit. Further a lathe according to the present invention has uniform accuracy despite thermal deformation and distortion of the bed body brought out by the heat of cut materials.

What is claimed is:

1. A vertical lathe, comprising:

a bed body;

a vertical turret support attaching surface in a front of said bed body;

a disc shaped tool holding turret having a plurality of tools spaced around and projecting from said turret;

a turret support fixed on said vertical turret support attaching surface;

a horizontally guiding rail mounted on said bed body;

a movable support movably mounted on said horizontally guiding rail;

a vertically guiding rail mounted on said movable support, and a head stock movably mounted on said vertically guiding rail, said head stock including:

a main spindle rotatably supported on said head stock for rotation about a vertical axis between said head stock and selected tools of said plurality of tools;

a motor for driving said main spindel; and a work holding chuck for holding a work during machining, said work holding chuck facing said work to be machined with a selected tool for such work to be performed selected from said plurality of tools.

2. A vertical lathe of claim 1, wherein two said vertical turret support attaching surfaces are provided, respectively located on each portion of two portions of said bed body, with said turret support being fixed on one of said two portions.

3. A vertical lathe of claim 1, wherein a concave surface is formed near said vertical turret support attaching surface and said concave surface, from a lower portion to an upper portion, inclines in a direction oriented to said horizontally guiding rail and, wherein, said turret is angle-of-rotation-dividably mounted on said turret support.

* * * * *